United States Patent [19]
Saxman

[11] Patent Number: 6,092,611
[45] Date of Patent: Jul. 25, 2000

[54] ENCAPSULATED ELASTOMERIC RELIEF VALVE

[75] Inventor: William C. Saxman, Dallas, Tex.

[73] Assignee: Dresser Industries, Inc., Dallas, Tex.

[21] Appl. No.: 09/081,484

[22] Filed: May 18, 1998

Related U.S. Application Data

[60] Provisional application No. 60/047,823, May 28, 1997.

[51] Int. Cl.[7] .................................................. E21B 10/24
[52] U.S. Cl. ......................... 175/227; 175/228; 175/371
[58] Field of Search ................................. 137/68.1, 68.23, 137/68.27, 846; 175/227, 228, 229, 371, 375; 384/93

[56] References Cited

U.S. PATENT DOCUMENTS

| | | | |
|---|---|---|---|
| 3,476,195 | 11/1969 | Galle | 175/228 |
| 3,847,234 | 11/1974 | Schumacher, Jr. et al. | 175/228 |
| 4,161,223 | 7/1979 | Oelke | 175/228 |
| 4,249,622 | 2/1981 | Dysart | 175/227 |
| 4,284,151 | 8/1981 | Levefelt | 175/227 |
| 4,386,667 | 6/1983 | Millsapps, Jr. | 175/228 |
| 4,399,878 | 8/1983 | Karlsson et al. | 175/227 |
| 4,453,836 | 6/1984 | Klima | 175/371 |
| 4,552,228 | 11/1985 | Evans et al. | 175/228 |
| 4,727,942 | 3/1988 | Galle et al. | 175/228 |
| 4,865,136 | 9/1989 | White | 175/227 |
| 5,072,795 | 12/1991 | Delgado et al. | 175/228 |
| 5,222,522 | 6/1993 | Rontome | 137/845 |
| 5,579,856 | 12/1996 | Bird | 175/375 |
| 5,593,231 | 1/1997 | Ippolito | 384/114 |

FOREIGN PATENT DOCUMENTS

| | | |
|---|---|---|
| 2037891 | of 1973 | Germany . |
| 2332737 | of 1974 | Germany . |
| 610508 | of 1948 | United Kingdom . |
| 2114711A | of 1983 | United Kingdom . |

*Primary Examiner*—William Neuder
*Attorney, Agent, or Firm*—Groover & Associates

[57] ABSTRACT

A relief valve for use in roller cone drilling bits of the sealed bearing type and other types of sealed fluid systems. The relief valve includes a valve body arranged to fit into the lubricating system of the bit and an elastomeric valve member having a flow port therein that is normally closed. The valve member includes a flexible lip defining the port that is arranged to permit flow in one direction through the port to relieve pressure above a predetermined value while preventing flow therethrough in the opposite direction.

16 Claims, 1 Drawing Sheet

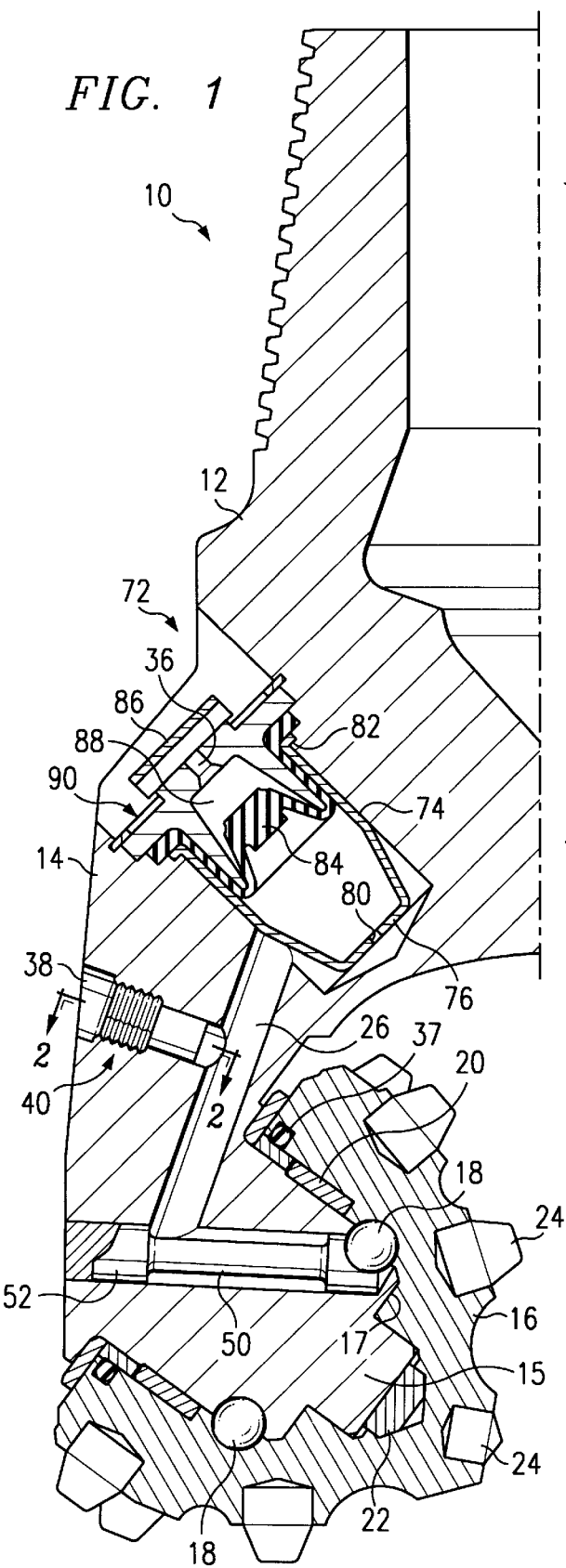

ENCAPSULATED ELASTOMERIC RELIEF VALVE

RELATED APPLICATION

This application claims the benefit of U.S. Provisional Patent Application Ser. No. 60/047,823, filed May 28, 1997.

TECHNICAL FIELD OF THE INVENTION

The invention relates to a pressure relief valve. More particularly, the invention relates to a pressure relief valve for use in a sealed lubricating system associated with roller cone drill bits and other types of enclosed systems which are subject to variations in pressure.

BACKGROUND OF THE INVENTION

Roller cone drill bits used to drill oil and gas wells often have a sealed lubricating system. Such drill bits generally incorporate a compensating mechanism to limit any pressure differential between lubricant sealed within the drill bit and well bore fluid adjacent to the drill bit. A common device is a flexible diaphragm separating the two fluids. The diaphragm responds to downhole conditions to maintain balanced pressure across the faces of fluid seals associated with the lubricating system. Flexible diaphragms also typically compensate for volumetric changes of lubricant which may occur in the form of leakage or through thermal expansion and contraction. Under certain conditions, lubricant expansion may exceed volumetric design limits of the associated lubricating system and generate an undesirable high pressure within the lubricating system. Damage to the fluid seals located to prevent the ingress of well bore fluid and escape of lubricant from the lubricating system is likely to occur if such high pressure is not satisfactorily vented or released.

Previous attempts with various styles of mechanical and/or elastomeric plunger type relief valves had limited success. Several drill bit manufacturers currently supply variations of two acceptable relief valve designs for achieving pressure relief. One system incorporates a disc spring which applies an axial sealing force to the periphery of the diaphragm. At some selected pressure differential, the spring force is overcome to relieve pressure in a manner similar to a pop-off type relief valve. The second system embodies a slit or puncture of some form within the compensating diaphragm itself.

Excess pressure is vented through the slit or puncture as it deforms when subjected to a selected pressure differential. This type of system may function as a one-way or two-way relief valve depending upon selected design. U.S. Pat. No. 3,847,234 entitled Pressure Relief Device for Drill Bit Lubrication System teaches the use of a separate two-way relief diaphragm, and associated seating components, threadably retained in a special vent passage formed in the bit.

SUMMARY OF THE INVENTION

In accordance with teachings of the present invention, disadvantages and problems associated with previous pressure relief mechanisms for roller cone drill bits have been substantially reduced or eliminated. One goal of the present invention is to provide a standardized self-contained pressure relief valve assembly with an elastomeric core for use primarily in sealed bearing roller cone drill bits. The present invention is also suitable for many other commercial applications where harsh environments may cause problems with contamination and/or corrosion of mechanical type relief valves.

The present invention herein provides superior pressure relief means in both fit and function as compared to prior art relief valves. An elastomeric element incorporating teachings of the present invention is maintained in a fixed position, thereby eliminating distorting flexural stresses imposed on previous slit/punctured diaphragms as they dynamically cycle to compensate for volumetric changes in lubricant. Roller cone drill bits used for drilling oil and gas wells typically have a sealed lubricating system which is filled with a selected lubricating fluid. During downhole drilling, fluctuations in temperature may cause large changes in fluid pressure within the sealed lubricating system. If pressure increases are not compensated for or relieved, one or more seals may be damaged.

The present invention may be easily designed into new products or incorporated into existing products without redesign, changes to tooling, manufacturing processes or inventory that are typically associated with product upgrades.

By virtue of its small size and standard method of incorporation into a sealed lubricating system associated with drill bits or any other type of enclosed fluid system requiring a pressure relief mechanism, subsequent improvements and enhancements may be affected with minimal development costs and with a significant reduction in the time required to get the improvement to the market. Nearly universal interchangeability affords the option of providing a pressure relief valve incorporating teachings of the present invention in a variety of pressure relief ranges to meet specific customer and application requirements.

Future developments and improvements to the invention can be incorporated in an economical and expedient manner. Functionality of a pressure relief valve incorporating teachings of the present invention is generally independent of the other components of the associated drill bit.

Improvements to conventional products may often require a redesign and retooling of several interrelated components that provide the pressure relief mechanism. Design change issues are further compounded when normally several families of proportionally sized parts are required to service the full range of products. Hundreds of parts may typically be affected.

A pressure relief valve incorporating teachings of the present invention effectively provides a competitive edge by offering practical choices when a specific application dictates the need for a sealed fluid system having a pressure relief feature.

BRIEF DESCRIPTION OF THE DRAWINGS

A more complete understanding of the present invention and its advantages will be apparent from the detailed description taken in conjunction with the accompanying drawings in which:

FIG. 1 is a schematic drawing partially in section with portions broken away taken through one arm of a roller cone drill bit having a relief valve that is constructed in accordance with teachings of the present invention mounted therein;

FIG. 2 is an enlarged, schematic drawing in section taken generally along lines 2—2 of FIG. 1 illustrating the relief valve in more detail;

FIG. 3 is a schematic drawing in section taken generally along lines 3—3 of FIG. 2 with the relief valve in its first, closed position;

FIG. 4 is a schematic drawing in section showing a view similar to FIG. 2, with the relief valve in its second, open position;

FIG. 5 is a schematic drawing in section taken generally along lines 5—5 of FIG. 4 with the relief valve in a second open position; and FIG. 6 is a schematic drawing in elevation with portions broken away illustrating an example of an enclosed chamber or sealed fluid system having a relief valve incorporating teachings of the present invention.

DETAILED DESCRIPTION OF THE INVENTION

The preferred embodiments of the present invention and its advantages are best understood by referring to FIGS. 1 through 6 of the drawings wherein like reference characters are used for like parts in all views.

FIG. 1 illustrates a partial cross sectional view of one embodiment of a roller cone rock bit indicated generally at 10. Roller cone rock bit 10 includes a pressure compensated lubricating system having an encapsulated elastomeric relief valve according to the teachings of the present invention. In a completed roller cone rock bit there are generally three arms with each arm having an independent lubricating system for the respective cutter cone mounted on the associated spindle.

Roller cone rock bit 10, only partially shown in FIG. 1, preferably includes a bit body having a threaded body portion 12 for connecting roller cone rock bit 10 to the lower end of a drill string (not shown). A roller cone assembly 16 is rotatably mounted on a spindle 15 which extends from a support arm 14.

Roller cone assembly 16 is a generally conically shaped structure having a plurality of cutting elements generally indicated by the reference character 24 provided on its outer periphery. As well known in the drilling art, rotation of roller cone rock bit 10 forms a well bore (not shown) as cutting elements 24 engage the wall and bottom of a well bore.

Roller cone assembly 16 has an internal cylindrical cavity 17 shaped to be rotatably supported on spindle 15. As shown in FIG. 1, internal cavity 17 accommodates a thrust button 22 for thrust bearing engagement with spindle 15, and accommodates a plurality of ball bearings 18 and bushing 20 set into internal cavity 17 for rotational bearing engagement with spindle 15.

Roller cone assembly 16 is retained on spindle 15 by ball bearings 18 inserted through a ball passageway 50 in spindle 15. Once inserted, ball bearings 18 prevent the disengagement of roller cone assembly 16 from spindle 15. Ball passageway 50 is subsequently closed with a ball plug 52 that is fixed in place.

A lubricant cavity 70, open to the outside surface of roller cone rock bit 10, is provided on cone support arm 14. Lubricant cavity 70 houses a lubricant reservoir indicated generally at 72. Lubricant reservoir 72 comprises a generally cylindrical lubricant canister 74 disposed within lubricant cavity 70. Lubricant canister 74 includes a closed end 76 defining an enclosed lubricant chamber 78. Closed end 52 has a lubricant opening 80 disposed therein. The opposite end of lubricant canister 74 includes a flanged shoulder 82 supporting a flexible resilient diaphragm 84 that encloses lubricant canister 74. A cap 86 covers diaphragm 84 and defines an outer chamber 88 facing diaphragm 84 to provide a volume into which diaphragm 84 can expand. Cap 86, diaphragm 84 and lubricant canister 74 are retained within lubricant cavity 70 by a snap ring 90. Cap 86 also includes an opening 36 for placing the outer face of diaphragm 84 in fluid communication with external well bore fluids surrounding roller cone rock bit 10. Lubricant chamber 78 between diaphragm 84 and lubricant canister 74 can be filled with a suitable lubricant to provide a source of lubrication for ball bearings 18, bushing 20 and thrust button 22, in roller cone rock bit 10.

A lubricant passageway 26 is drilled through arm 14 to place lubricant cavity 70 in fluid communication with ball passageway 50. Lubricant passageway 26 is drilled from an end of lubricant cavity 70 generally adjacent to lubricant opening 80 in lubricant canister 74. Ball passageway 50 further provides communication between lubricant passageway 26 and ball bearings 18, bushing 20 and thrust button 22.

The pressure of the external fluids outside roller cone rock bit 10 is transmitted to the lubricant in lubricant canister 74 through diaphragm 84. The flexing of diaphragm 84 maintains the lubricant at a pressure generally equal to the pressure of the external fluids outside roller cone rock bit 10. This pressure is transmitted through lubricant passageway 26 and ball passageway 50.

An elastomeric seal 37 encircles a portion of spindle 15 within roller cone assembly 16 to retain the lubricant in roller cone assembly 16 and around bushing 20, ball bearings 18, and thrust button 22. Elastomeric seal 37 also prevents deleterious materials from entering into roller cone assembly 16 and causing premature bit failure by damaging bushing 20, ball bearings 18 and/or thrust button 22.

Diaphragm 84 is provided in an effort to prevent the imposition of high differentials across elastomeric seal 37. Sometimes excessive differential pressure is inadvertently imposed across roller cone rock bit 10. That is, the pressure within the lubricating system becomes substantially higher than the pressure of the mud and other drilling fluids. For example, lubricant expansion may exceed volumetric design limits of diaphragm 84 and generate an undesirable high pressure within the lubricating system. Damage to the fluid seals located to prevent the ingress of well bore fluid and escape of lubricant from the lubricating system is likely to occur if such high pressure is not satisfactorily vented or released.

In order to introduce lubricant into roller cone assembly 16, a fill passageway 38 extends through a portion of cone support arm 14 intersecting lubricant passageway 26. The outer end of passageway 38 is preferably threaded to receive a lubricant fitting (not shown) for filling the lubricant system associated with support arm 14 and roller cone assembly 16 with the desired quantity of lubricant. After filling the lubricant system and roller cone assembly 16 with lubricant, either a threaded plug (not shown) or a relief valve 40 may be inserted into passageway 38, as desired, to seal passageway 38 and prevent communication between passageway 38 and the exterior of roller cone drill bit 10.

Pressure relief valve 40, which is constructed in accordance with teachings of the present invention, may be inserted into passageway 38. Although FIG. 1 shows a threaded pressure relief valve 40 being inserted into threaded passageway 38, the connection between pressure relief valve 40 and roller cone rock bit 10 can be accomplished using any type of mechanical connection or fastening technique. In another embodiment, pressure relief valve 40 may be formed as an integral component of roller cone rock bit 10.

Although the embodiment shown in FIG. 1 shows pressure relief valve 40 within fill passageway 38, relief valve 40 may be located anywhere within support arm 14, provided communication between the sealed lubricant system and the well bore is allowed. The details of construction of relief valve 40 are more clearly shown in FIGS. 2, 3, 4 and 5.

One embodiment of the present invention includes relief valve 40 with an elastomeric valve member 42 that is preferably molded into and encapsulated within a valve body 44. Elastomeric valve member 42 is generally cylindrically shaped and includes a funnel shaped cavity 43 extending from one end 110 toward an opposite end 112. Opposite end 112 of elastomeric valve member 42 is typically closed. Elastomeric valve member 42 may be manufactured from a nitrile compound and valve body 44 may be made from a zinc phosphated alloy steel, for example.

A small pinhole or flow port 46 is preferably formed in elastomeric valve member 42 extending from cavity 43 through end 112 of valve member 42. Port 46 is more clearly shown in FIGS. 3, 4 and 5. Port 46 can be molded into valve member 42 or formed therein by puncturing valve member 42 with a pointed, pin-like instrument (not shown). For the embodiment shown in FIGS. 2–5, port 46 was formed using the latter technique.

In one embodiment of the present invention, flow port 46 is formed from the inside out, by puncturing valve member 42 with a precision instrument from the inside (non threaded) end of valve body 44 to the outside (threaded) end of valve body 44. By puncturing valve member 42 in this manner, flow port 46 formed with the precision instrument will be more likely to allow lubricant to flow from the inside out, than to allow mud or other well bore fluids to flow from the outside in. This protects the bearing system and other components associated with support arm 14 and roller cone assembly 16 from contaminants, and allows the relief of excessive pressure buildup within the associated sealed lubricant system.

As shown in FIGS. 2 and 3, port 46 is normally closed and resists fluid communication between the well bore (not shown) through passageway 38 and into lubricant passageway 26. This is due to the design of valve member 42. During drilling, if mud or other well fluids on the exterior of roller cone rock bit 10 are at a higher pressure than the lubricant pressure within support arm 14, port 46 will remain in its first, closed position blocking fluid flow.

Valve member 42 is preferably formed with a reduced diameter portion that defines in part an annular flexible lip 48. The configuration and dimensions of annular lip 48 are selected to allow expansion thereof when lubricant pressure in lubricant passageway 26 is greater than the pressure of the drilling mud or other well bore fluids adjacent to end 112. FIG. 4 illustrates lip 48 in an expanded position which allows port 46 to open. The geometry of elastomeric valve member 42 is such that lip 48 will contract, forcing port 46 to close, when subjected to an external pressure or well bore fluid pressure that is higher than lubricant pressure. Thus, fluid flow can normally occur in only one direction through relief valve 40. Mud or other well bore fluids are normally prevented from entering the lubricating system of roller cone rock bit 10 by lip 48 sealing port 46.

In alternative embodiments, valve member 42 can be formed from any elastomer or other resilient material. Also, end 112 and cavity 43 of valve member 42 may be modified as appropriate for the desired opening and closing pressure associated with port 46 and desired fluid flow through port 46. For example, increasing the outside diameter of valve member 42 adjacent to end 112 and/or increasing the length of port 46 may increase the difference in fluid pressure required to open port 46.

One of the advantages of the present invention is the ability to substitute elastomers of varying strength to achieve different performance characteristics of the associated pressure relief valve. Another advantage of the present invention is the ability to modify the dimension and configuration of valve member 42. Valve member 42 can be manufactured to open at a desired pressure. For example, lip 48 can be designed so that lip 48 will expand and port 46 will open to permit flow out of roller cone assembly 16 through port 46 when the pressure within the cutting cone is at least 100 p.s.i. greater than the pressure in the well bore. In the same embodiment, lip 48 can be designed so that port 46 will remain closed and restrict flow from the well bore into passageway 38 when the pressure in the well bore is approximately 3,800 p.s.i. greater than the pressure in the fluid passageway. By varying the type of material and the size, shape and length of the flow port, the performance characteristics of the pressure relief valve can be manipulated to suit various applications.

For some applications, elastomeric valve member 42 may be initially formed without port 46 extending completely through lip 48. For these embodiments lip 48 may be scored in such a manner that the desired differential pressure will cause lip 48 to rupture and effectively form port 46. Alternatively, the thickness of elastomeric material selected to form lip 48 may be relatively thin such that when the desired difference in pressure occurs between lubricant passageway 26 and the exterior of roller cone rock bit 10, lip 48 will rupture and relieve excess lubricant pressure to the exterior of roller cone rock bit 10.

From the foregoing, it will be appreciated that relief valve 40 can be inexpensively, easily and quickly manufactured,is easily retrofitted into existing bits, and requires no changes in bit design to be incorporated into new bits. A bit incorporating a relief valve constructed in accordance with the present invention is effectively protected from damage that could be caused by the imposition of an unexpected pressure differential across the lubricating system in the bit.

Furthermore, the benefits of the present invention are not limited to the drill bit industry. As illustrated in FIG. 6, sealed fluid system 59, including an enclosed chamber 60 and pressure relief valve 40, is provided. Chamber 60 may represent any enclosure which is isolated from ambient pressure and contains a fluid therein. Chamber 60 includes an enclosure 62 which defines a cavity 64. A threaded cylindrical opening 66 is preferably provided in enclosure 62 for coupling pressure relief valve 40 with enclosure 62. Cavity 64 is isolated from ambient pressure by enclosure 62.

When the pressure within cavity 64 deviates from the ambient pressure surrounding chamber 60, pressure relief valve 40 provides a method for equalizing the pressure within chamber 60 with ambient pressure. Moreover, pressure relief valve 40 may be situated within opening 66 such that high pressure outside of chamber 60 may flow into chamber 60 to compensate for any pressure losses or a reduced pressure within chamber 60. Within this embodiment, pressure relief valve 40 may be configured to resist the flow of pressure in the opposite direction.

Alternatively, relief valve 40 may be situated such that higher pressure existing within chamber 60 may be released through relief valve 40 in order to equalize the pressure within chamber 60 with ambient pressure. Accordingly, relief valve 40 would resist the flow of higher ambient pressure into chamber 60. By altering the orientation, size and type of pressure relief valve, the teachings of the present invention may be incorporated into the design of any system requiring the release or equalization of fluid pressure within a chamber. Furthermore, the present invention may be utilized for any application where a mechanical type pressure relief valve is unacceptable due to harsh environmental conditions where debris and contaminants cause excessive wear on mechanical valves, springs, metal seats, and other operating parts.

Although the present invention and its advantages have been described in detail, it should be understood that various changes, substitutions, and alterations can be made therein without departing from the spirit and scope of the invention as defined by the appended claims.

What is claimed is:

1. A pressure relief valve for use in a high-pressure, sealed fluid system, the relief valve comprising:
   a valve body having a connection for attachment to a high-pressure sealed fluid system and a hollow inner portion which is generally cylindrical;
   an elastomeric valve member disposed within the valve body, said elastomeric valve member having a first portion of an outer surface which generally conforms to said hollow inner portion of said valve body;
   a generally funnel-shaped cavity formed within said elastomeric valve member, said cavity having a greater diameter at a first end of said valve member and a smaller diameter near a second end of said elastomeric valve member; and
   a puncture formed at least partially through said valve member at said second end to define a flow port between said cavity and said second end of said valve member;
   whereby fluids can exit said cavity through said flow port, but are not allowed to enter said cavity through said flow port.

2. The pressure relief valve of claim 1 wherein the flow port is configured such that the elastomeric valve member will rupture at its second end when fluid pressure within the fluid system exceeds the fluid pressure outside the fluid system by a predetermined amount.

3. The pressure relief valve of claim 1 further comprising:
   a flexible lip formed adjacent to the second end of the valve member with the flow port extending at least partially therethrough.

4. The pressure relief valve of claim 1 wherein the puncture extends from the cavity through the second end of the valve member.

5. The pressure relief valve of claim 1 wherein said connection for attachment comprises mechanical threads for the coupling of the valve body with the sealed fluid system.

6. The pressure relief valve of claim 1 wherein the puncture is formed with a precision pin-like instrument.

7. The pressure relief valve of claim 1 wherein the puncture is formed within the valve member with a precision pin-like instrument from the first end of the valve member toward the second end of the valve member to accommodate fluid flow through the flow port, from the first end of the valve member toward the second end of the valve member.

8. The pressure relief valve of claim 1 further comprising:
   the flow port having a first, closed position which blocks fluid flow from the exterior of the sealed fluid system to the interior of the sealed fluid system; and
   the flow port having a second, open position which allows fluid to flow from the sealed fluid system through the flow port to the exterior of the sealed fluid system when the difference between the fluid pressure within the sealed fluid system and the fluid pressure outside the sealed fluid system exceeds a preselected value.

9. A pressure relief valve for use in a sealed lubricating system of a roller cone drill bit, the relief valve comprising:
   a valve body having a connection for attachment to a high-pressure sealed fluid system and a hollow inner portion which is generally cylindrical;
   an elastomeric valve member disposed within the valve body, said elastomeric valve member having a first portion of an outer surface which generally conforms to said hollow inner portion of said valve body;
   a generally funnel-shaped cavity formed within said elastomeric valve member, said cavity having a greater diameter at a first end of said valve member and a smaller diameter near a second end of said elastomeric valve member;
   a generally funnel-shaped cavity formed within the valve member, having a larger portion of said funnel-shaped cavity near the first end of said valve member and a smaller portion of said funnel-shaped cavity near the second end of said valve member;
   a puncture formed at least partially through said valve member at said second end to define a flow port between said cavity and said second end of said valve member;
   a flexible lip formed adjacent to said second end of said valve member with said flow port extending at least partially therethrough;
   wherein said elastomeric valve member has a first, closed position which blocks fluid blow from the exterior of the drill bit to the sealed lubricating system and a second position which allows lubricating fluid to flow from the sealed lubricating system through the passageway to the exterior of the drill bit when the difference between the pressure of the lubricating fluid and the pressure of the fluid on the exterior of the drill bit exceeds a preselected value.

10. The pressure relief valve of claim 9 wherein the flow port is configured such that the elastomeric valve member will rupture at its second end when fluid pressure within the sealed lubricating system of the roller cone drill bit exceeds the fluid pressure outside the sealed lubricating system by a predetermined amount.

11. The pressure relief valve of claim 9 wherein the puncture extends from the cavity through the second end of the valve member.

12. The pressure relief valve of claim 9 wherein said connection for attachment comprises mechanical threads for coupling of the valve body with the sealed lubricating system of the roller cone drill bit.

13. The pressure relief valve of claim 9 wherein the puncture is formed within the valve member with a precision pin-like instrument from the first end of the valve member toward the second end of the valve member to accommodate fluid flow through the flow port, from the first end of the valve member toward the second end of the valve member.

14. A roller cone drill bit for forming a well bore comprising:
   a bit body with an upper end portion adapted for connection to a drill string for rotation of the bit body;
   a plurality of cutter cones rotatably mounted to said bit body;
   a lubrication system having lubricant passageways disposed within said bit body;
   an opening extending from the exterior of the drill bit to one of lubricant passageways;
   a relief valve disposed in the opening said relief valve comprising:
      a valve body having a connection for attachment to a high-pressure sealed fluid system and a hollow inner portion which is generally cylindrical;

an elastomeric valve member disposed within the valve body, said elastomeric valve member having a first portion of an outer surface which generally conforms to said hollow inner portion of said valve body;

a generally funnel-shaped cavity formed within said elastomeric valve member, said cavity having a greater diameter at a first end of said valve member and a smaller diameter near a second end of said elastomeric valve member; and a puncture formed at least partially through said valve member at said second end to define a flow port between said cavity and said second end of said valve member;

whereby fluids can exit said cavity through said flow port, but are not allowed to enter said cavity through said flow port.

15. The roller cone drill bit of claim 14 wherein the flow port is configured such that the elastomeric valve member will rupture at its second end when fluid pressure within the sealed lubricating system of the roller cone drill bit exceeds the fluid pressure outside the sealed lubricating system by a predetermined amount.

16. The roller cone drill bit of claim 16 wherein the puncture extends from the cavity through the second end of the valve member.

* * * * *